United States Patent
Seibold

(10) Patent No.: US 6,267,426 B1
(45) Date of Patent: Jul. 31, 2001

(54) SEAT ASSEMBLY

(76) Inventor: Kurt A. Seibold, 11896 Fair Way Dr., South Lyon, MI (US) 48178

( * ) Notice: Subject to any disclaimer, the term of this patent is extended or adjusted under 35 U.S.C. 154(b) by 0 days.

(21) Appl. No.: 09/650,948

(22) Filed: Aug. 29, 2000

(51) Int. Cl.$^7$ .................................................. B60N 3/12
(52) U.S. Cl. ........................ 296/37.16; 296/66; 296/69; 296/65.16; 296/65.09
(58) Field of Search ................... 296/37.16, 66, 296/69, 65.16, 65.09

(56) References Cited

U.S. PATENT DOCUMENTS

| | | |
|---|---|---|
| 1,669,757 | 5/1928 | Irvine . |
| 2,818,274 | 12/1957 | Manos . |
| 2,998,281 | 8/1961 | Stoner et al. . |
| 3,365,231 | 1/1968 | Burtt . |
| 3,669,488 * | 6/1972 | Derrickson, Jr. et al. ............. 296/66 |
| 3,711,153 | 1/1973 | Cunningham . |
| 3,761,127 | 9/1973 | Giese et al. . |
| 3,955,846 * | 5/1976 | Murphy .................................... 296/69 |
| 3,957,304 | 5/1976 | Koutsky et al. . |
| 4,025,110 | 5/1977 | Poorman . |
| 4,292,698 | 10/1981 | Acker . |
| 4,699,418 * | 10/1987 | Plavetich ................................ 296/69 |
| 4,805,953 * | 2/1989 | Yamauchi ......................... 296/65.16 |
| 4,957,321 * | 9/1990 | Martin et al. ..................... 296/65.16 |
| 4,979,773 * | 12/1990 | Eubank ............................. 296/65.16 |
| 5,123,706 | 6/1992 | Granzow et al. . |
| 5,310,247 | 5/1994 | Fujimori et al. . |
| 5,318,341 | 6/1994 | Griswold et al. . |
| 5,383,699 * | 1/1995 | Woziekonski et al. ........... 296/65.16 |
| 5,641,198 | 6/1997 | Steffens, Jr. . |
| 5,641,202 * | 6/1997 | Rus .................................. 296/65.16 |
| 5,658,046 * | 8/1997 | Rus .................................. 296/65.16 |
| 5,673,971 | 10/1997 | Wieclawski . |
| 5,681,077 * | 10/1997 | Hashimoto ....................... 296/65.16 |
| 5,697,670 | 12/1997 | Husted et al. . |
| 5,791,738 | 8/1998 | Niezoldt . |
| 5,851,055 | 12/1998 | Lewis . |
| 5,957,522 * | 9/1999 | Matshihashi et al. ............ 296/65.09 |
| 5,975,612 * | 11/1999 | Macey et al. ......................... 296/66 |
| 6,015,186 * | 1/2000 | Grieger .................................. 296/69 |
| 6,123,380 * | 9/2000 | Sturt et al. ........................ 296/65.09 |
| 6,158,799 * | 12/2000 | Guilford ............................ 296/65.09 |
| 6,196,613 * | 3/2001 | Arai .................................. 296/65.13 |

* cited by examiner

Primary Examiner—Joseph D. Pape
Assistant Examiner—Kiran B. Patel
(74) Attorney, Agent, or Firm—Steven C. Becker

(57) ABSTRACT

A seat assembly for a vehicle having a seat back and a support member. The seat back is connectable to the vehicle for pivotal movement between an upright-use position and a generally horizontal-stored position. The support member is connectable to the seat back and pivotally attachable to the vehicle. The seat back and the support member are operable to form a truss in the upright-use position and a substantially continuous load surface in the horizontal-stored position.

18 Claims, 5 Drawing Sheets

SEAT ASSEMBLY

TECHNICAL FIELD OF THE INVENTION

This invention generally relates to a seat assembly for a vehicle. More specifically, this invention relates to a seat assembly for a vehicle in which a support member and a seat back function between an upright-use position that forms a truss and a horizontal-stored position that forms a continuous load surface.

BACKGROUND

Vehicle seat designers have developed various seat and seat belt arrangements that attempt to provide a convenient seat belt system for a seat occupant. To this end, a more recent seat belt system, herein referred to as the integrated seat system, allows the seat belts to be installed directly on the vehicle seat regardless of the seat position within the vehicle. The integrated seat system thus remains in a constant position relative to the seat occupant, thereby placing the seat belt within easy reach of the seat occupant.

Some seat assemblies have been created that include a support mechanism to provide additional support for the seat assembly. These support mechanisms are intended to divert any loads and their resulting stresses away from the mounting pivots of the seat assembly. Although some of these support mechanisms have increased the structural strength of the seat assembly, to date their configurations have reduced the flexibility of the vehicle to carry cargo, which is a highly valued feature in the automotive industry. Specifically, vehicle manufacturers desire to provide a cargo load surface in the rear of a sedan or hatchback type vehicle by folding the rear seat backs forward into a mutually aligned position with the cargo compartment floor.

Some current support mechanism designs have allowed the seat backs to fold forward. However, these designs create cargo load surfaces that are discontinuous, i.e., there exists a large gap between the seat back and the support mechanism in which objects may inadvertently fall or become stuck. Therefore, there is a need in the automotive industry to provide an integrated seat system that creates a substantially continuous cargo load surface in a sedan or hatchback type vehicle from the rear of the interior compartment forward to the front seats.

SUMMARY OF THE INVENTION

Accordingly, this invention provides a seat assembly for a vehicle which overcomes the problems and disadvantages of the conventional techniques in the art. This invention also provides for an integrated seat system for a vehicle in which a support member and a seat back function between an upright-use position that forms a trurss and a horizontal-stored position that forms a substantially continuous load surface.

Briefly, the invention includes a seat assembly for a vehicle having a seat back and a support member. The seat back is connectable to the vehicle for pivotal movement between an upright-use position and a generally horizontal-stored position. The support member is connected to the seat back and attachable to the vehicle. The seat back and the support member are operable to form a truss in an upright-use position and a substantially continuous load surface in a horizontal-stored position.

Further features and advantages of the invention will become apparent from the following discussion and accompanying drawings.

DETAILED DESCRIPTION OF THE PREFERRED EMBODIMENT

The following description of the preferred embodiment is merely exemplary in nature, and is in no way intended to limit the invention or its application or uses.

Figure 1:
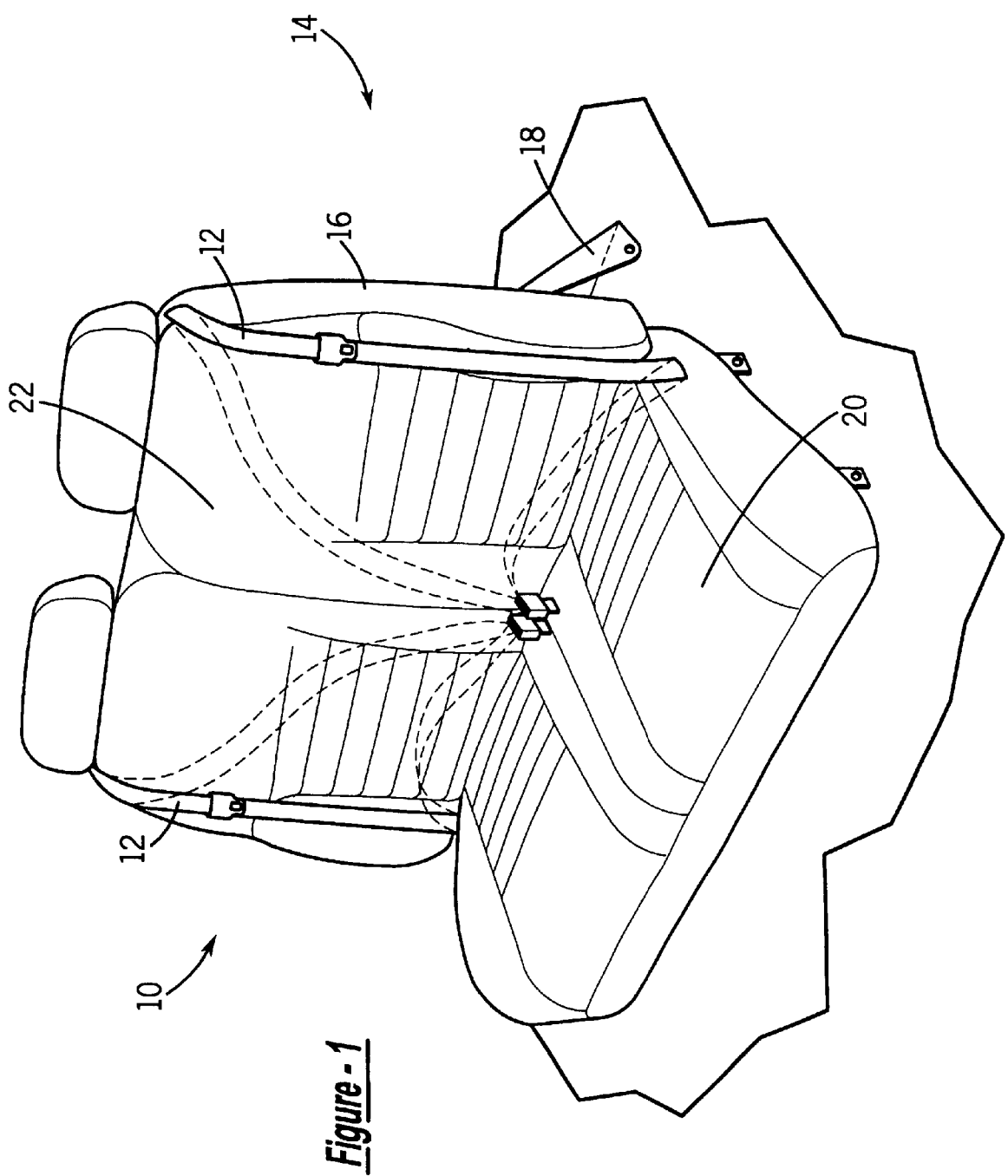
FIG. 1 is a front perspective view of an integrated seat system having a seat assembly made in accordance with the teachings of the present invention.

As shown in FIG. 1, the present invention provides for a rear seating arrangement 10 of a vehicle. Although the seating arrangement 10 may be used in any vehicle, the seating arrangement 10 is preferably used with a passenger vehicle having a rear cargo space behind the seating arrangement 10. The seating arrangement 10 is preferably an integrated seat system, having a pair of seat belts 12 integrally formed on the seating arrangement 10, such that each seat belt 12 remains in a constant position relative to the seat occupant. The seating arrangement, however, may alternatively be of a more conventional non-integrated seat type.

The seat assembly 14 of the present invention includes a seat back 16 and a support member 18, which preferably work in association with a typical seat cushion 20. The seat cushion 20 is fastened to a seat frame (not shown) of the vehicle and functions to provide a seating surface for the occupants of the vehicle. In certain applications, such as in rear seats of a smaller car, the seat frame may be an integral part of the vehicle floor pan (not shown). In other seat applications, such as in the front seats of a larger car, the seat frame may be slidably attachable to the vehicle floor pan. Yet, in other seat applications, such as in the rear seats of minivans, the seat frame may be wholly detachable from the vehicle floor pan. The seat frame of each application, however, functions to support the seat cushion 20.

As mentioned above, the seat assembly 14 of the present invention includes the seat back 16 and the support member 18. The seat back 16 functions to provide an adequate resting surface for at least one occupant, but preferably is of the bench type arrangement, which provides resting surfaces for two or more occupants. An interior foam core (not shown) and an exterior trim cover 22 are preferably disposed on the seat back 16 to provide additional comfort for the seat occupants. The seat back 16 and the support member 18 are preferably made from a lightweight metal, but may be made from other materials, such as stiff plastics and composites. The interior foam core and the exterior trim cover 22 are preferably made from conventional materials, well known and used in the seating art, but may be made from any suitable materials.

Figure 2:
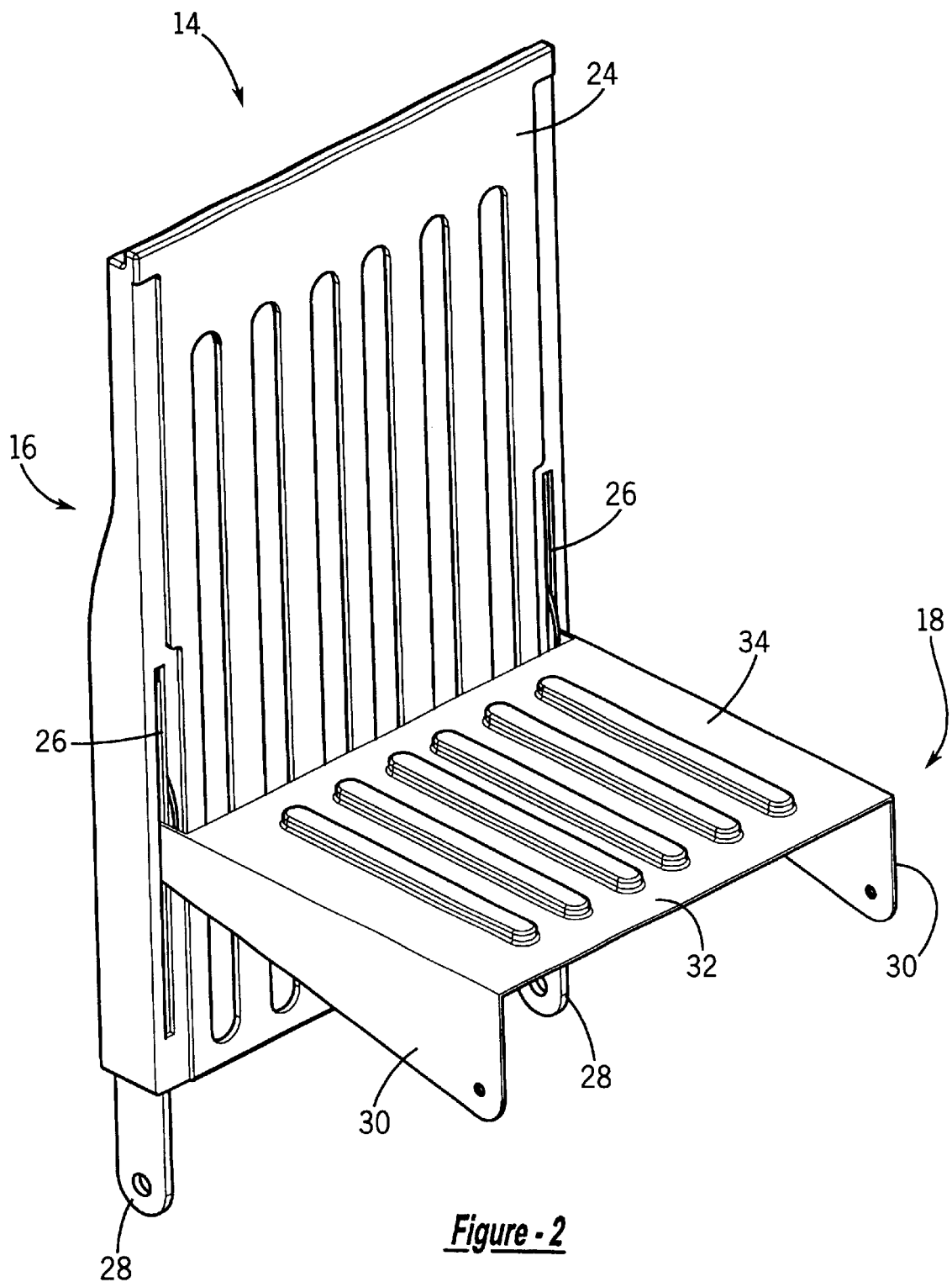
FIG. 2 is a rear perspective view of the seat assembly made in accordance with the teachings of the present invention.

As shown in FIG. 2, the seat back 16 of the seat assembly 14 preferably includes a generally planar first rear surface 24 and a pair of guide slots 26 located on either side of the seat back 16. In addition, the seat back 16 preferably includes a pair of mounting pivots 28 located on either side of the seat back 16. The mounting pivots 28 are preferably mounted to the vehicle floor (not shown), but alternatively may be mounted to the seat cushion 20 (see FIG. 1) or the seat frame (not shown). The mounting pivots 28 allow the seat back 16 to be rotated about a first lateral axis.

The support member 18 preferably includes a pair of side arms 30 interconnected by a panel 32. The pair of side arms 30 and the panel 32 form a generally planar second rear surface 34. The support member 18 preferably has a width substantially the same as the width of the seat back 16, but may alternatively have a greater or smaller width.

Figure 3:
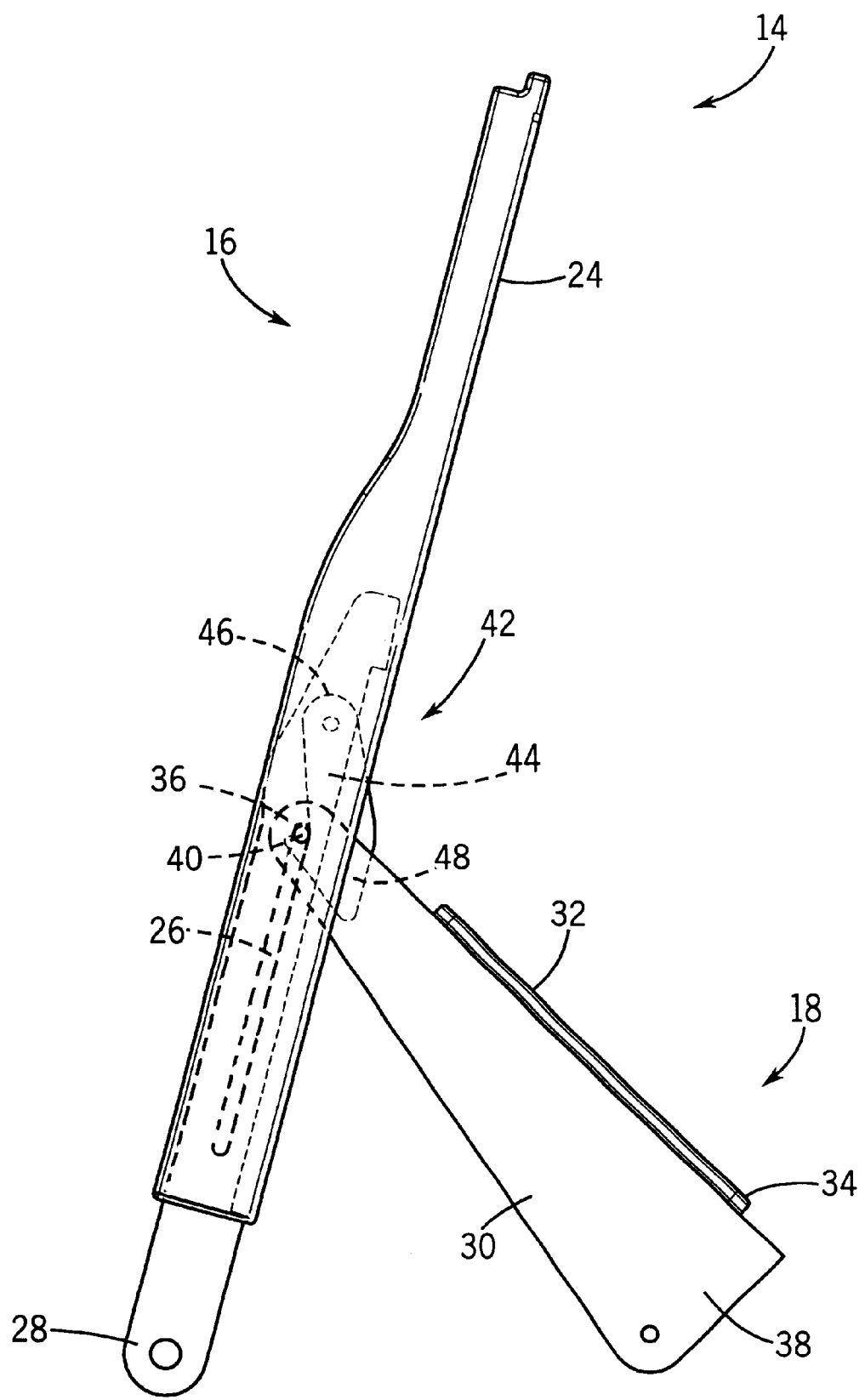
FIG. 3 is a side view of the seat assembly of FIG. 2, illustrating the seat assembly in an upright-use position.

As best seen in FIG. 3, each side arm 30 preferably has a first end 36 and a second end 38. In the preferred embodiment, the first end 36 of each side arm 30 is slidably connected to the seat back 16 by a pair of pins 40. The pins 40 are located on either side of the seat back 16 and correspond with the guide slots 26 of the seat back 16 to provide slide means for slidably connecting the support member 18 to the seat back 16. In alternate embodiments, other means, such as a track and wheel mechanism or a notched ratcheting mechanism, may be used to slidably connect the first end 36 of the support member 18 to the seat back 16. The second end 38 of each side arm 30 is pivotally attached to the vehicle floor, or another suitable object, for rotation of movement about a second lateral axis.

In the preferred embodiment, a latch mechanism 42 has a J-shaped member 44 that is used to lock the first end 36 of the side arm 30 of the support member 18 to the seat back 16 and restrict its downward movement. In alternate embodiments, the member 44 may be of a different shape, such as a loop, a cam, a C-shape, or a U-shape. The J-shaped member 44 has a first portion 46 pivotally connected to the seat back 16 and a second portion 48 releasably attached to the first end 36 of at least one of the pair of side arms 30 of the support member 18. The latch mechanism 42 is adaptable to releasably lock the support member 18 to the seat back 16. The latch mechanism 42 cooperates to engage the pin 40 of the support member 18 to restrict the movement of the pin 40 along the guide slot 26 of the seat back 16. A spring assembly (not shown) may be used to bias the J-shaped member 44 toward an open or a closed position.

Figure 4:
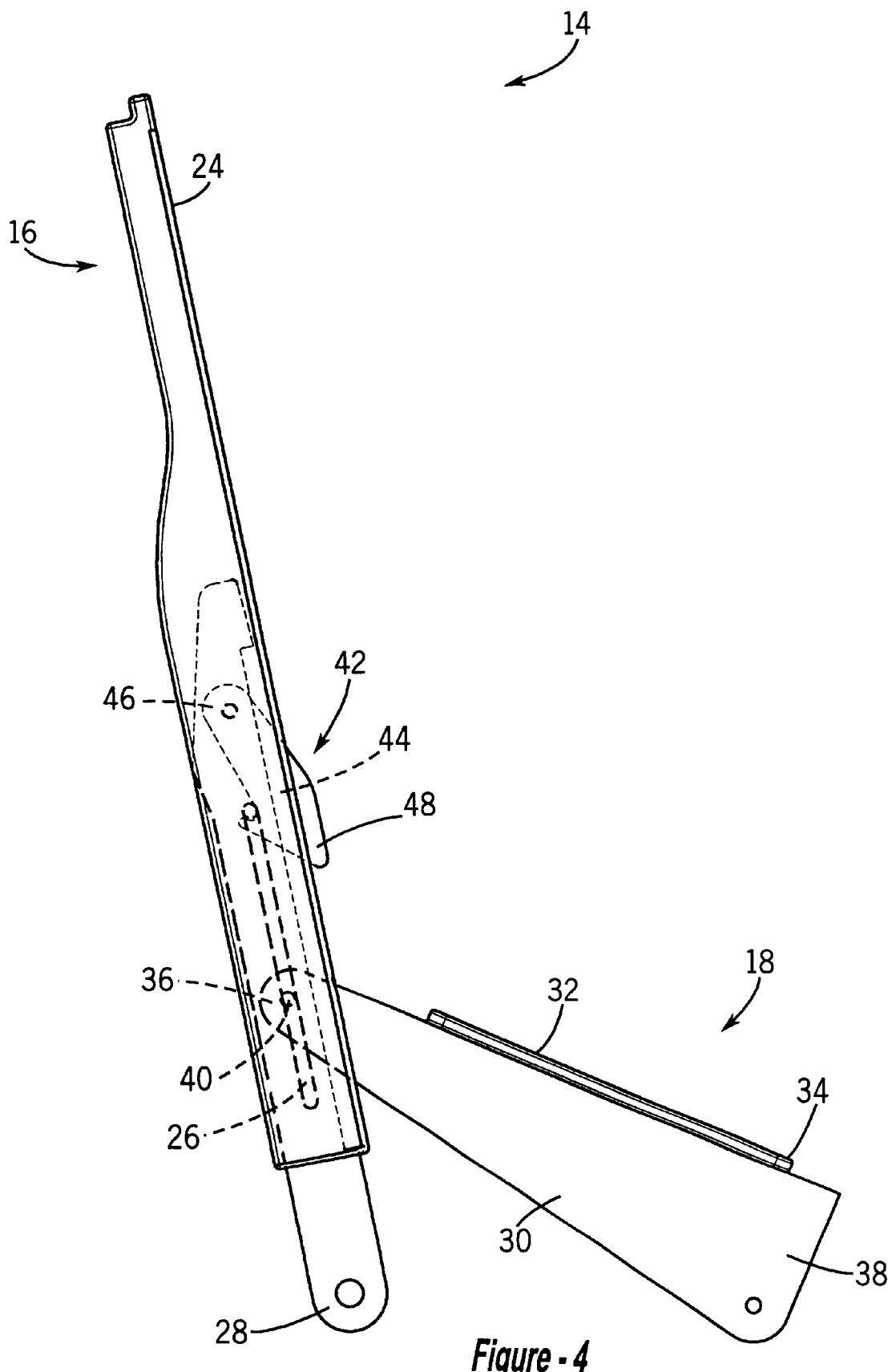
FIG. 4 is a side view of the seat assembly of FIG. 2, illustrating the seat assembly in a transient position.
Figure 5:
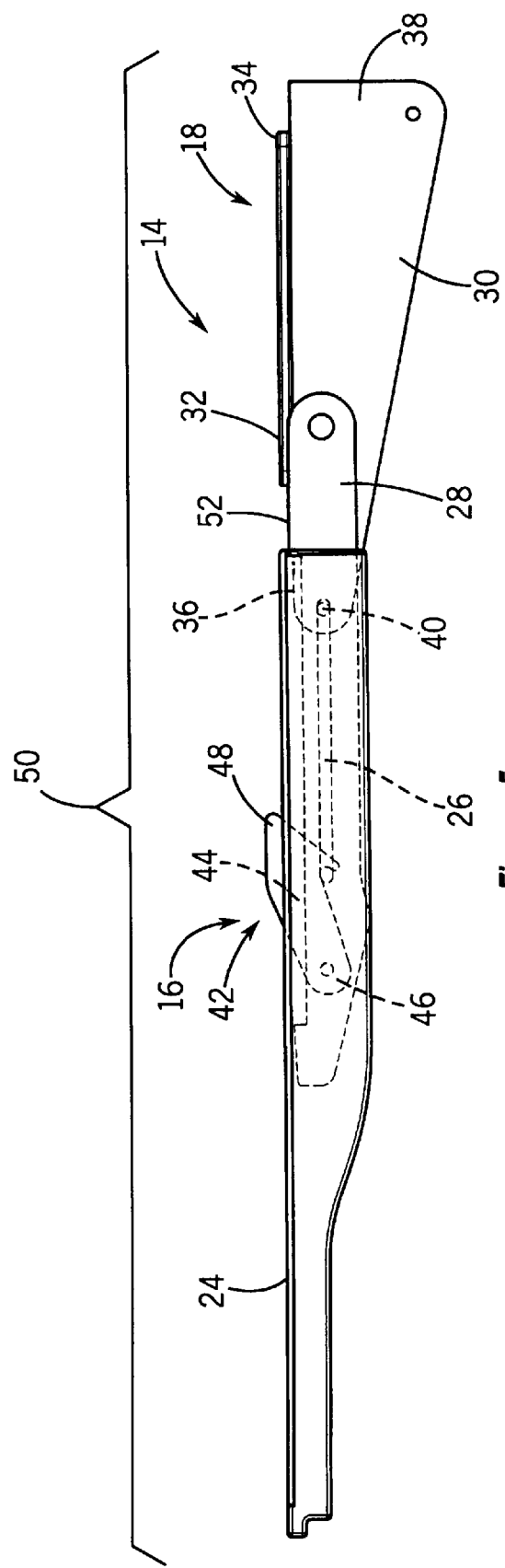
FIG. 5 is a side view of the seat assembly of FIG. 2, illustrating the seat assembly in a horizontal-stored position.

As shown in FIGS. 3 through 5, the seat back 16 and the support member 18 cooperate to form an upright-use position and a horizontal-stored position. In the upright-use position, as shown in FIG. 3, the seat back 16 is substantially vertical to allow a seat occupant to comfortably rest against the seat back 16. The latch mechanism 42 cooperates with the pin 40 to lock the first end 36 of the side arm 30 at the upper end of the guide slot 26. The support member 18 is positioned at an angle such that it provides support to the seat back 16. In this manner, the latch mechanism 42 locks the seat back 16 to the support member 18 such that they work in association with the vehicle floor to form a three-sided truss, thereby reducing the stresses placed on the mounting pivots 28 of the seat back 16 and increasing the strength of the seat assembly 14. The support member 18 and seat back 16 form a rigid structure which restricts any pivotal movement of the seat back 16 relative to the vehicle floor.

By rotating the J-shaped member 44, the latch mechanism 42 disengages the pin 40, thereby releasing the seat back 16 and support member 18 from the upright-use locked position. As shown in FIG. 4, the seat back 16 and support member 18 can then be rotated forward about their respective pivoted axes. As the seat back 16 and support member 18 rotate forward, the pin 40 slides downwardly along the guide slot 26. This forward movement continues such that the seat back 16 and support member 18 may be folded into a generally horizontal-stored position, as shown in FIG. 5. In this position, the pin 40 and the first end 36 of the side arm 30 are located at the lower end of the guide slot 26. In this horizontal-stored position, the planar first rear surface 24 of the seat back 16 and the planar second rear surface 34 of the support member 18 combine to form a substantially planar continuous load surface 50 with a very small, or nonexistent, gap 52 between the seat back 16 and the support mechanism 18. This continuous load surface 50 extends the rear cargo area of the vehicle to allow a variety of cargo to be stored.

The foregoing discussion discloses and describes a preferred embodiment of the invention. One skilled in the art will readily recognize from such discussion, and from the drawings and claims, that changes and modifications can be made to the invention without departing from the true spirit and fair scope as defined in the following claims.

I claim:

1. A seat assembly for a vehicle, comprising:
   a seat back connectable to the vehicle for pivotal movement between an upright-use position and a generally horizontal-stored position, said seat back having a generally planar first rear surface and a pair of guide slots; and
   a support member having a pair of side arms interconnected by a panel thereby forming a generally planar second rear surface, each of said pair of side arms having a first end slidably connected to one of said pair of guide slots of said seat back and a second end pivotally attachable to the vehicle for rotational movement;
   wherein said seat back and said support member being operable to form a truss in the upright-use position, and said generally planar first rear surface and said generally planar second rear surface being operable to form a substantially continuous load surface in the horizontal-use position.

2. The seat assembly of claim 1 wherein said seat back provides an adequate resting surface for two or more occupants.

3. The seat assembly of claim 1 wherein said seat back is attachable to a vehicle floor.

4. The seat assembly of claim 1 wherein said seat back is attachable to a seat cushion of the vehicle.

5. The seat assembly of claim 1 further comprising a latch mechanism having a first portion pivotally connected to said seat back and a second portion releasably attachable to said first end of at least one of said pair of side arms, wherein said latch mechanism is adaptable to releasably lock said support member to said seat back in one of said upright-use position and said horizontal-stored position.

6. The seat assembly of claim 5 wherein said latch mechanism is substantially J-shaped.

7. The seat assembly of claim 1 wherein said support member has at least one pin which cooperates with at least one of said guide slots to slidably connect said support member to said seat back.

8. A seat assembly for a vehicle, comprising:
   a seat back connectable to the vehicle for pivotal movement between an upright-usec position and a generally horizontal-stored position; and
   a support member connected to said seat back and attachable to the vehicle, said seat back and said support member being operably connectable to form a truss in the upright-use position and a substantially continuous load surface in the horizontal-stored position.

9. The seat assembly of claim 8 wherein said seat back provides an adequate resting surface for two or more occupants.

10. The seat assembly of claim 8 wherein the seat back is attachable to vehicle a floor.

11. The seat assembly of claim 8 wherein the seat back is attachable to a seat cushion.

12. The seat assembly of claim 8 wherein said support member is connectable to said seat back for sliding movement relative to said seat back.

13. The seat assembly of claim 8 wherein said seat back has a generally planar first rear surface and a pair of guide slots.

14. The seat assembly of claim 13 wherein said support member has a pair of side arms interconnected by a panel thereby forming a generally planar second rear surface, each of said pair of arms having a first end slidably connected to one of said pair of guide slots of said seat back and a second end attachable to the vehicle for rotational movement.

15. The seat assembly of claim 14 wherein said support member has at least one pin which cooperates with at least one of said guide slots to slidably connect said support member to said seat back.

16. The seat assembly of claim 14 further comprising a latch mechanism having a first portion pivotally connected to said seat back and a second portion releasably attachable to said first end of at least one of said pair of side arms, wherein said latch mechanism is adaptable to releasably lock said support member to said seat back in one of the upright-use position and the horizontal-stored position.

17. The seat assembly of claim 16 wherein said latch mechanism is substantially J-shaped.

18. The seat assembly of claim 14 wherein said first rear surface and said second rear surface are operable to form the continuous load surface in the horizontal-stored position.

* * * * *

UNITED STATES PATENT AND TRADEMARK OFFICE
CERTIFICATE OF CORRECTION

PATENT NO.    : 6,267,426 B1
DATED         : July 31, 2001
INVENTOR(S)   : Seibold It is certified that error appears in the above-identified patent and that said Letters Patent is hereby corrected as shown below:

<u>Title page,</u>
Below item [76] Inventor, insert the following:

-- [73] Assignee: Johnson Controls Technology Company,
                  Plymouth, Michigan --; and the Attorney, Agent, or
                  Firm should read -- Foley & Lardner --.

Signed and Sealed this

Thirteenth Day of November, 2001

Attest:

NICHOLAS P. GODICI
Attesting Officer    Acting Director of the United States Patent and Trademark Office